United States Patent [19]

Otto et al.

[11] Patent Number: 4,825,981
[45] Date of Patent: May 2, 1989

[54] AXIALLY SPLIT BRAKE DISK

[75] Inventors: Alfred W. Otto, Herten; Wolfgang Lehmann, Remscheid; Henryk Piontke, Wuppertal, all of Fed. Rep. of Germany

[73] Assignee: Bergische Stahl-Industrie, Remscheid, Fed. Rep. of Germany

[21] Appl. No.: 144,794

[22] Filed: Jan. 15, 1988

[30] Foreign Application Priority Data

Jan. 15, 1987 [DE] Fed. Rep. of Germany ....... 3701012

[51] Int. Cl.⁴ .................. F16D 65/12; F16D 65/807
[52] U.S. Cl. ...................... 188/218 XL; 188/264 AA
[58] Field of Search ............ 188/71.6, 18 A, 218 XL, 188/264 AA; 301/6 CS, 6 WB; 192/70.12, 85 AA, 107 R, 113 A

[56] References Cited

U.S. PATENT DOCUMENTS

| | | | |
|---|---|---|---|
| 3,314,509 | 4/1967 | Pelikan | 188/218 XL |
| 3,368,654 | 2/1968 | Wegh et al. | 301/6 WB X |
| 3,422,936 | 1/1969 | Marcheron | 188/218 XL |
| 3,904,000 | 9/1975 | Berger | 188/218 XL |
| 4,132,294 | 1/1979 | Poli | 188/218 XL |

FOREIGN PATENT DOCUMENTS

| | | |
|---|---|---|
| 2060352 | 6/1972 | Fed. Rep. of Germany . |
| 2062407 | 7/1972 | Fed. Rep. of Germany . |
| 2228738 | 1/1974 | Fed. Rep. of Germany . |

*Primary Examiner*—Robert J. Oberleitner
*Attorney, Agent, or Firm*—Becker & Becker, Inc.

[57] ABSTRACT

An axially split brake disk that includes two brake bands that form a brake ring and are interconnected by ribs. The brake disk further includes two brake ring halves that are separated by concentric and radially extending seams of division, in each of which one of the brake ring halves is provided with a projection that extends in a concentric direction, while the other brake ring half is provided with a corresponding U-shaped recess that accommodates the projection. The width of the projection is less than the width of the brake ring, as measured in a radial direction. The projection of the one brake ring half, as well as that portion of the other brake ring half in which the recess is provided, are provided with corresponding radially extending bores for receiving a holding mechanism, such as a sleeve-like or rod-like member, that is provided with pin-like elements for preventing the holding mechanism from shifting in a radial direction relative to the brake ring halves.

7 Claims, 1 Drawing Sheet

U.S. Patent    May 2, 1989    4,825,981
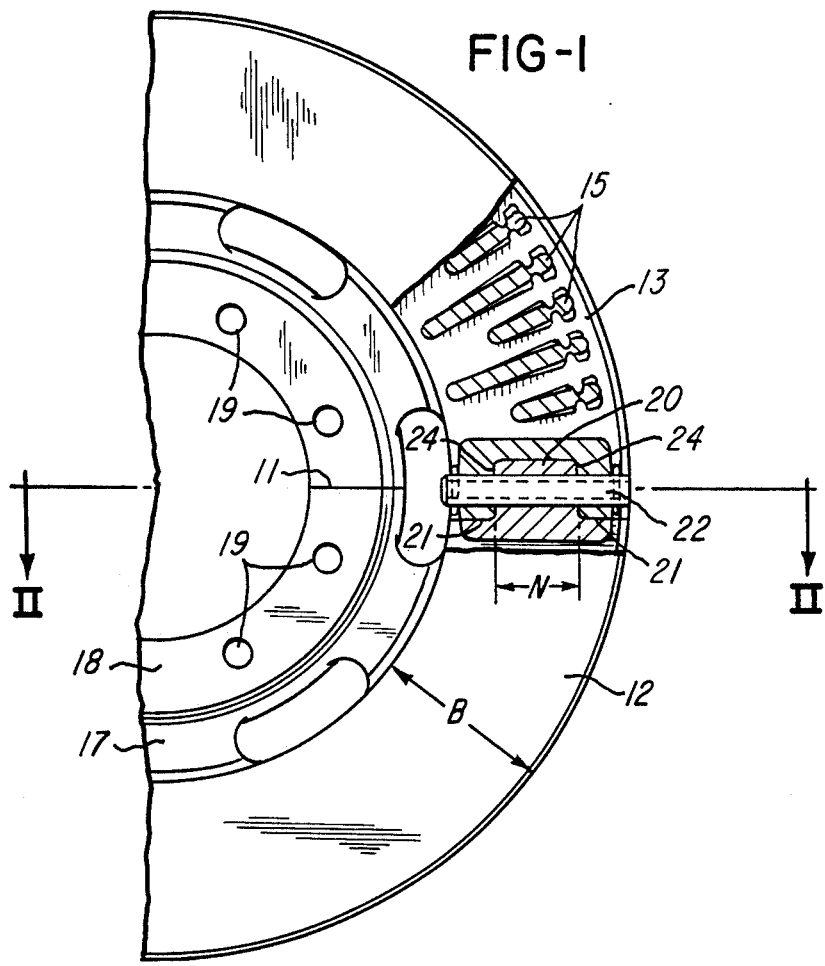
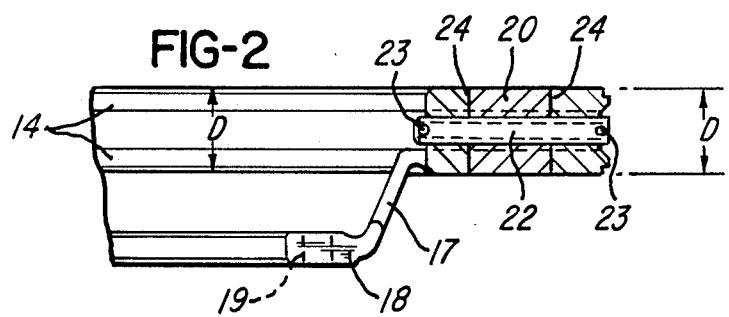

AXIALLY SPLIT BRAKE DISK

BACKGROUND OF THE INVENTION

The present invention relates to an axially split brake disk, including two brake bands that form a brake ring and are interconnected by ribs that form cooling channels. Arm-like or cup-shaped connecting elements extend from the inner periphery of the brake ring and serve for connection of the brake disk to an attachment member, such as a wheel hub, a hub that is secured to an axle or other shaft, etc.

The problem continuously arises of having to remove worn-out one-piece brake disks that are disposed on axles, and replacing them with new brake disks, ideally without having to back the wheels or drive gears off of the axle. Up to now, it was often customary to install the one-piece brake disks in a divided condition, or to use two-part brake disks right from the start, since the destruction of worn-out, one piece brake disks has a significant economic impact. However, the drawback with the heretofore known brake disks is that up to now no connection has been provided between the two brake disk halves that functions satisfactorily under all circumstances and that is also economical and technically practical.

Thus it has been tried, in general, to connect the two brake disks halves securely to one another with bolts that are disposed approximately tangentially in the brake ring (see German patent No. 22 28 738, Otto et al dated Jan. 3, 1974 and belonging to the assignee of the present invention). However, in so doing it was always necessary to provide special adapter pieces because during heating up and cooling off, the two halves shifted relative to one another during braking, both concentrically as well as radially. It was therefore proposed, in German Offenlegungsschrift No. 20 60 352, Gronemann dated Jun. 15, 1972 and belonging to the assignee of the present invention, to provide each brake disk half with only a single bolt on the hub, and a tangential bolt in the brake band, in order to permit sufficient play. However, this led to imbalances that prohibited the use of such a brake disk. It was also attempted (German Offenlegungsschrift No. 20 62 407, Zeuner et al dated July 13, 1972 and belonging to the assignee of the present invention) to effect the connection of the two brake disk halves and the securement on the hub with two tangential bolts in the brake band. This idea also could not be put into practice because the retainment in the hub was poor.

All of the heretofore known constructions have the drawback that they cannot be readily used with narrow brake bands.

It is therefore an object of the present invention to avoid the drawbacks of the heretofore known constructions, and to assure, even with extremely narrow brake bands, that the applied braking forces are transmitted to the attachment member, such as a wheel hub or a hub that is pressed or bolted onto an axle. It is a further object of the present invention that the radial expansion of the brake disk in the brake ring portion be assured when the disk heats up.

BRIEF DESCRIPTION OF THE DRAWING

These and other objects and advantages of the present invention will appear more clearly from the following specification in conjunction with the accompanying schematic drawing, in which:

FIG. 1 is a partially cross-sectioned side view of one exemplary embodiment of half an inventive brake disk; and FIG. 2 is a cross-sectional view taken along line II—II in FIG. 1 through the connection region of the two brake ring halves.

SUMMARY OF THE INVENTION

The brake disk of the present invention comprises two brake ring halves that are separated by concentric and radially extending seams of division, in each of which one of the brake ring halves is provided with a projection that extends in a concentric direction, while the other brake ring half is provided with a corresponding U-shaped recess that accommodates the projection; the width of the projection is less than the width of the brake ring, as measured in a radial direction; the projection of the one brake ring half, as well as that portion of the other brake ring half in which the recess is provided, are provided with corresponding radially extending bores for receiving a holding means, such as a sleeve-like or rod-like member, with the holding means being provided with pin-like means for preventing the holding means from shifting in a radial direction relative to the brake ring halves.

The projection and the recess advantageously cover the entire thickness of the brake ring.

A substantially frictional connection is expediently provided between the projection and the recess via a force fit.

The advantage of the inventive configuration consists primarily in that this type of connection between two brake disk halves can also be used for extremely narrow brake bands and yet still have all of the advantages, such as the possibility for radial expansion of the brake ring when the latter heats up during braking, without having the individual parts of the brake disk distort separately, the result of which would be an inoperative brake disk. The inventive brake disk could also be installed in new vehicles, because it has exactly the same advantages as does a one-piece brake disk.

Further specific features of the present invention will be described in detail subsequently.

DESCRIPTION OF PREFERRED EMBODIMENTS

Referring now to the drawing in detail, the brake disk illustrated in FIGS. 1 and 2 is split into two halves 12 and 13 via a concentric seam of division 11. The two halves 12, 13 are essentially identical, and each including two brake bands 14 that are interconnected by the ribs 15 and form a brake ring. Disposed on the inner periphery of the brake ring are arms 17 that end in a mounting ring 18 via which the brake disk is secured to the wheel hub, or to a non-illustrated hub that is disposed on the axle, by means of bolts that are disposed in the holes 19. In the radially and concentrically disposed seam of division 11, the brake ring half 12 is provided with a projection 20 that extends in a concentric direction; the width N of the projection 20 is less than the width B of the brake ring. The other brake ring half 13 is provided with a U-shaped recess 21 that corresponds to the projection 20, with the recess 21 and the projection 20 covering the entire thickness D of the brake disk. Corresponding, radially extending bores are provided not only in the projection 20 but also in the recess 21. A holding bushing, rod-like member or sleeve 22 is disposed in these radially extending bores, and is, in turn, prevented from shifting in a radial direction by pins 23 that are disposed in holes at both ends of the holding sleeve 22. A substantially frictional connection is produced between the projection 20 and the recess 21 by means of a force fit at the surfaces 24 (see FIG. 1), as a result of which the holding sleeve 22, to a large extent, is relieved of stress. Accordingly, the entire brake ring is kept from moving in itself and so that said brake ring halves are held together as rigidly connected with each other to function as a unit.

The two brake disk halves 12 and 13 are identical to the extent that one side of each half is provided with a projection 20, and the other side thereof is provided with a recess 21. The two break ring halves 12, 13 are substantially symmetrically identical.

During assembly, the two brake disk halves 12 and 13 are initially held together on the hub by the frictional force produced by the bolts that are disposed in the holes 19. In addition, however, the holding sleeves 22 are also provided to hold the two brake disk halves 12 and 13 together. When during a braking operation the braking ring heats up, it expands radially, during the course of which the holding sleeves 22 hold the two halves 12, 13 of the brake ring in the same plane. The expansion of the brake ring is compensated for in the mounting arms 17.

The present invention is, of course, in no way restricted to the specific disclosure of the specification and drawing, but also encompasses any modifications within the scope of the appended claims.

What we claim is:

1. An axially split brake disk in an arrangement including two brake bands that form a brake ring having an inner periphery and are interconnected by ribs that form cooling channels; said arrangement further including substantially cup-shaped connecting elements that extend from the inner periphery of the brake ring and serve for connection of the brake disk to an attachment member; said brake disk further comprises:

two brake ring halves that are separated from one another by concentric and radially extending seams of division, in each of which one of said brake ring halves is provided with a projection that extends in a concentric direction, while the other of said brake ring halves is provided with a corresponding U-shaped recess that accommodates said projection; the width of said projection is less than the width of said brake ring, as measured in a radial direction; said projection of said one brake ring half, as well as that portion of said other brake ring half in which said recess is provided, are provided with corresponding radially extending bores for receiving a holding means that is provided with a radially disposed pin-like means for preventing said holding means from shifting in a radial direction relative to said brake ring halves so that the entire brake ring is kept from moving in itself and so that said brake ring halves are held together as rigidly connected with each other to function as a unit.

2. A brake disk according to claim 1, in which said holding means is a sleeve-like member.

3. A brake disk according to claim 1, in which said holding means is a rod-like member.

4. A brake disk according to claim 1, in which said projection and said recess portion of said other brake ring half cover the entire thickness of said brake ring.

5. A brake disk according to claim 1, in which said projection and said recess are provided with mating surfaces that cooperate via a force fit to provide a substantially frictional connection between said brake ring halves.

6. A brake disk according to claim 1, in which said each brake ring half has a projection at one seam of division and a recess at the other seam of division.

7. A brake disk according to claim 6, in which said two brake ring halves are substantially symmetrically identical.

* * * * *